United States Patent
Imholte (10) Patent No.: US 7,113,933 B1
(45) Date of Patent: Sep. 26, 2006

(54) METHOD AND SYSTEM FOR AUTOMATED GENERATION OF A REQUESTED REPORT IN A COMPUTER SYSTEM

(75) Inventor: Laura M. Imholte, Roseville, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 386 days.

(21) Appl. No.: 10/289,599

(22) Filed: Nov. 7, 2002

(51) Int. Cl.
G06F 17/30 (2006.01)

(52) U.S. Cl. ............... 707/1; 707/9; 707/10; 705/8; 705/11

(58) Field of Classification Search .......... 705/8–11; 707/1–3, 10, 100–102, 104.1
See application file for complete search history.

(56) References Cited

U.S. PATENT DOCUMENTS

| | | | |
|---|---|---|---|
| 5,182,705 A | 1/1993 | Barr et al. | 705/11 |
| 5,557,515 A | 9/1996 | Abbruzzese et al. | 705/9 |
| 5,675,745 A | 10/1997 | Oku et al. | 705/7 |
| 5,726,914 A | 3/1998 | Janovski et al. | 702/84 |
| 5,765,140 A | 6/1998 | Knudson et al. | 705/8 |
| 5,826,239 A | 10/1998 | Du et al. | 705/8 |
| 5,864,821 A | 1/1999 | Hosoda et al. | 705/8 |
| 5,893,074 A | 4/1999 | Hughes et al. | 705/8 |
| 5,893,905 A | 4/1999 | Main et al. | 705/11 |
| 5,907,829 A | 5/1999 | Kida | 705/9 |
| 5,913,201 A | 6/1999 | Kocur | 705/9 |
| 6,519,763 B1 * | 2/2003 | Kaufer et al. | 717/101 |
| 6,678,671 B1 * | 1/2004 | Petrovic et al. | 707/1 |
| 6,810,383 B1 * | 10/2004 | Loveland | 705/9 |
| 2002/0038235 A1 | 3/2002 | Musafia et al. | 705/11 |
| 2002/0046072 A1 | 4/2002 | Arai et al. | 705/8 |
| 2002/0065702 A1 | 5/2002 | Caulfield | 705/9 |
| 2002/0091559 A1 | 7/2002 | Beniyama et al. | 705/9 |
| 2002/0091560 A1 | 7/2002 | Suzuki et al. | 705/9 |
| 2002/0107723 A1 | 8/2002 | Benjamin et al. | 705/11 |
| 2002/0111841 A1 | 8/2002 | Leymann et al. | 705/7 |
| 2003/0004790 A1 * | 1/2003 | Calderaro et al. | 705/11 |
| 2003/0229618 A1 * | 12/2003 | Judy | 707/1 |
| 2004/0054562 A1 * | 3/2004 | Tanaka | 705/7 |
| 2004/0054566 A1 * | 3/2004 | J'Maev | 705/7 |

OTHER PUBLICATIONS

U.S. Appl. No. 60/389,681, filed on Jun. 17, 2002.*

* cited by examiner

Primary Examiner—Debbie M. Le
(74) Attorney, Agent, or Firm—Snell & Wilmer L.L.P.

(57) ABSTRACT

There is provided a method and system for efficiently generating administrative reports in an automated manner and for enabling users, who contributing to the reports, to create and store task, goal, progress and performance related descriptions, of varying complexity and detail, in a central database location from which appropriate task, goal and progress descriptions can be selectively retrieved for use in a desired periodic report for use in workload and performance management. This method and system frees up full time employees from the time consuming work of repeatedly preparing descriptions and information for workload and performance reports and substantially eliminates rework for administrative assistant who often consolidate and compile reports.

10 Claims, 2 Drawing Sheets

METHOD AND SYSTEM FOR AUTOMATED GENERATION OF A REQUESTED REPORT IN A COMPUTER SYSTEM

FIELD OF THE INVENTION

The present invention relates generally to report generation on a computerized system. More particularly, the present invention relates to a system and method for providing an automated task, assignment, and activity reporting tool that uses a computerized data processing system, having a database application with a database management system, to generate selected workload management and performance management reports.

BACKGROUND OF THE INVENTION

The generation of administrative reports relating to the activities, tasks, assignments, priorities and performance of full time employees (FTE) in an organization is a common and frequent manual process. The reports are typically prepared by employees in one organizational level for review, comment and approval by individuals in a higher or more senior level in the organization. The reports typically include workload and performance related reports, among other reports. Workload reports include information relating to an employee's current and projected assignments or tasks and priorities. Performance reports include information relating to the status, priority and progress of tasks that have been assigned to an employee or that the individual is responsible for. Further, performance reports can include information that tracks an individual's progress toward organizational goals and the employee's personal and professional development goals.

Typically, administrative reports are generated on a regular and periodic basis to meet the needs and requirements of individuals or departments within an organization. For example, the reports could be generated weekly, bi-weekly, monthly, quarterly, at midyear and/or at year's end. Administrative reports enable organizations to carry out workload management and performance management of their employee workforce. The reports can serve as a tool for supervisors and senior management to know the workload of employees, how employee resources are being allocated, whether the allocation of personnel resources is optimum, how to improve employee productivity, whether employees are making progress toward organizational goals, the productivity of employees and department, etc. For employees, the reports can serve as a tool to stay on schedule in their assigned tasks and responsibilities, and as a means to track and measure progress toward their personal development goals.

Existing processes for preparing workload or task reports are very time consuming for the employees that are required to prepare descriptions of their assigned tasks and status or updates for those tasks. The preparation of workload reports typically involves various levels of employees or personnel in an organization or company depending on the number and level of managers, leaders or supervisors that will receive the workload reports.

Typically, employees on a first or initial level will prepare descriptions or summaries of the tasks they are responsible for. The first level employees commonly provide a status or update on their assigned tasks as required by a particular report. Further, depending on the type of workload or task report ultimately being prepared, the first level employee will often provide varying levels of detail or complexity in their description and summaries. For example, the desired report may be a bi-weekly, monthly, quarterly or yearly report. These periodic reports tend to have the same general content but different levels of detail. Thus, the employee will have to repeat the preparation of task descriptions or summaries with the same general content but different levels of detail to match the desired report. Furthermore, the employee may have to send the prepared task descriptions to different individuals in an organization or to different locations or departments in the organization.

Once the employee has completed the preparation of the tasks descriptions, the employee can send them to a designated individual or group of individuals. However, before sending the prepared descriptions, the employee may send them to an assigned administrative assistant. The administrative assistant will generally be familiar with the employees tasks and will review, verify and compile the employee's task descriptions. The administrative assistant will typically be assigned to various employees and thus will review and compile all the tasks descriptions submitted to her by various employees.

Once the employee task descriptions are compiled and ready for submission, either the individual employee or the responsible administrative assistant will forward all the prepared task descriptions to a next designated level for inclusion into the desired report. For example, if the desired report is for an accounting department, the employees may be first level accountants and they may be submitting their tasks descriptions to their manager, supervisor or department head, who are typically at a second or higher level in the organization relative to the employee preparing the task descriptions. Further, the prepared tasks descriptions are usually submitted to a second administrative assistant supporting the second level manager, supervisor or department head. The second administrator will also received other prepared descriptions from other first level administrative in the same department. This can be the case because an administrative assistant may only be assigned to a few employees, e.g., four employees, while there may be a large number of employees in the department, e.g., twenty employees. Thus, there would be more than one administrative assistant in the first level for that department.

The second administrative assistant will then compile all the received task descriptions into the desired report, e.g., a monthly report of employee workload and task status. If the second level is the final destination of the report, then the prepared report is a master report. The report is then submitted to the second level manage, supervisor or department head. The second level individual can then use the prepared master report for workload management. The second level individual will be able to see where his employees resources are allocated and be able to track their task progress in light of department or organizational goals or benchmarks. The second level individual could then maintain the status quo if all is well or reassign, re-prioritize, and reallocate employee resources as deemed necessary to meet department or organizational goals.

If the desired report is intended to be for a next or higher level, e.g., at a higher senior level above the department level, the compiled report prepared by the second administrative assistant will be sent to a next or third level. Once the compiled report for one department is complete and ready for submission, the responsible second level individual or the assigned second level administrative assistant will forward the prepared department report having the compiled task descriptions to the next designated third level for inclusion into the desired third level report. For example, if the desired report is for an overall organization, the second level individual may be a department head or supervisor that is submitting the department compiled report having tasks descriptions to a senior leader or organization head, who is at a third or higher level in the organization relative to the department head submitting the department report. Again, the compiled individual department reports are typically submitted to a third administrative assistant supporting the senior leader or organization head. The third administrator will again received other prepared department reports from other second level administrative assistants from the various organization departments, e.g., engineering, marketing, research, finance, payroll, etc. This is the case, as each department head in the second level, usually via an administrative assistant, will submit their compiled department report.

The third administrative assistant will then compile all the received department reports into the desired report, e.g., a monthly report of department tasks and status along with employee workload and task status. If the third level is the final destination of the report, then the compiled report is a master report. The report is then submitted to the third level senior leader or organization head. The third level individual can then use the prepared master report for workload management. The third level individual will be able to determine the progress of each department in the organization and where employees resources are allocated. The third level individual will be able to track department progress toward organizational goals or benchmarks. The third level individual can then maintain the status quo if all is well or reassign, re-prioritize, or reallocate department and employee resources as deemed necessary to meet organizational goals. Those of skill in the art, will readily recognize that this manual process is typically repeatable for a large organization or group that has a large number of employees, departments, groups, businesses units, or organizational layers.

A similar manual process is carried out for the creation of performance reports for employees in department or organization for use in performance management reports. In these types of reports, the employees and supervisors might enter descriptions of development goals for themselves and for their work group, individual employees might further enter goals aimed at meeting goals set by supervisors or their own development goals. Further, employees and supervisors may enter comments relating to performance evaluations. The performance reports can be used to track employee development goals and work performance for employee performance review.

Performance reports are typically generated at mid-year and year-end when employee goal assessments are prepared and performance reviews are conducted. The employees, managers and supervisors can then use the prepared performance reports for performance management. Individual employees and supervisory personnel are able to determine whether the employee's tasks and responsibilities are pertinent to developing the employee's skill and abilities. Also, employees and supervisory personnel are able to track employee progress toward their individual and company goals, as well as determine whether the employees are performing their jobs at an acceptable level. In this manner, employees and supervisory personnel can determine, among other things, if an employee needs to be reassigned to another more challenging position or whether performance raises should be given.

The manual processes described are representative of existing methods used to generate reports in organizations to assist in workload and performance management. The reports can be generated on a weekly, monthly, quarterly or semi-yearly, yearly basis, or any other desired time period. Further, the processes just described are manual process that are time intensive and typically take full time employees (FTE) away from performing their primary organizational duties and responsibilities in order to prepare the description for administrative reports. For example, an engineer, account and payroll employee must take time out of performing their engineering, accounting or payroll duties to prepare task and performance related descriptions and status for workload and performance reports. In addition, administrative assistant are typically brought into the manual report preparation process and must spend a large amounts of time manually compiling receive task and performance related descriptions into complied workload or performance reports.

Another drawback to existing the manual report generation processes is that, depending on the type of report to be generated, the various employees creating the task and performance related descriptions must typically create the task and performance related descriptions at different points in time and usually stored them at different locations, e.g. each employee might store their workload or performance descriptions on their own separate computers or on the computers of their administrative assistants. Thus, the various employee workload and performance descriptions are typically scattered throughout a department or organization which makes the report generation process more time consuming since takes time to create and bring the appropriate employee descriptions together for the compilation of a desired report. Thus, existing manual report generation processes, like those described, can be very time and manpower intensive, and can substantially interfere with an employee's primary duties and responsibilities, as well as their ability to provide a high level of value added work to the organization.

There is thus a need for an improved and efficient method for generating administrative reports in an automated manner for use in workload and performance management. There is also a need for an automated method for generating administrative reports that enables users contributing to the reports to create and store task, goal and progress related descriptions in a central location from which appropriate task, goal and progress descriptions can be selectively retrieved for use in a desired periodic report for use in workload and performance management.

SUMMARY OF THE INVENTION

The present invention provides a novel and improved method for efficiently generating administrative reports in an automated manner and that enables users contributing to the reports to create and store task, goal and progress related descriptions in a central location from which appropriate task, goal and progress descriptions can be selectively retrieved for use in a desired periodic report for use in workload and performance management. There is provided a method for providing an automated report generation via a computerized data processing system having a database application with a database management system to efficiently generate selected workload management and performance management reports. The method and system provides an efficient tool for reporting on activities and an efficient way to track mid-year and year-end performance review activities. The method and system substantially eliminates rework for those employees who consolidate reports and frees up valuable resource time of full time employees (FTE) from the highly administrative work of repeatedly preparing information for these reports.

There is provided an improved reports database system and method that combines work load management and performance management to enable automatic reporting capability. This system allows a plurality of users to input user specific information and descriptions into pre-formatted data entry forms or data entry screens to create and store user database records in a database system or storage. In this manner, users can keep track of their tasks, assignments, goals and performance, as well as progress towards user and organization goals in a single or central location. Further, users are able to enter a plurality of descriptions with various levels of detail or complexity for use in generating desired or selected workload and performance reports. After, the user has entered and stored user information, appropriate reports can then be requested by the same user or different individual by selecting an appropriate icon or button on a computer screen or by creating and executing appropriate database queries. The system then creates, via a database management system (DBMS), the requested report by retrieving and cascading the pertinent previously entered user descriptions. The requested report is then presented to the individual or user requestor. The system can generate any desired report for which pertinent descriptions have been previously entered and stored by the users.

There is provided a method of generating a report in a computerized system having a database application comprising the steps of a) providing a secure access to at least one of a plurality of users to said computer system, b) at least one of a plurality of users entering descriptions and information, via a user interface, into a plurality of corresponding data entry fields in a preformatted data entry form, wherein said user descriptions comprise varying levels of descriptive detail, c) creating a unique user record for each of said plurality of users entering said user descriptions and information, d) storing said created user records in a centralized database location, e) receiving a request from a requesting user for a desired periodic report that meets a data entry field search criteria, f) accessing said plurality of user records, g) determining which of said plurality of user records meet said data entry field search criteria, h) retrieving user descriptions and user information from those user records that meet said data entry field search criteria for inclusion in said requested periodic report, and i) generating said desired periodic report to said requesting user. Alternate embodiments of the novel method further comprise the steps of informing a supervisory user of said created and stored user record, and allowing review and updating of a created and stored user record by an authorized user.

It is an object of the present invention to provide a method and system to provide an efficient tool for reporting on activities on a periodic basis, e.g., bi-weekly, monthly, quarterly, etc.

It is an object of the present invention to combine workload management with performance management by tracking and storing employee tasks and employee progress towards employee goals in the same location.

It is an object of the present invention to allows users and employees to input task and goal information in one location and have it cascade to an appropriate report when a report is requested and generated.

It is an object of the present invention to allows users to document tasks and goals in various levels of complexity and detail for various reports to be generated.

It is an object of the present invention to provide a method and system to eliminate rework for those who consolidate reports.

It is an object of the present invention to provide a method and system to provide an efficient tool to track mid-year and year-end performance review activities to free up full time employee resource time from highly administrative work.

It is an object of the present invention to simplify the administrative responsibilities of full time employees and thus enable employees to provide more value added services to their employer, company or organization.

The following drawings and description set forth additional advantages and benefits of the invention. More advantages and benefits will be obvious from the description and may be learned by practice of the invention.

BRIEF DESCRIPTION OF THE DRAWINGS

The present invention may be better understood when read in connection with the accompanying drawings, of which.

DETAILED DESCRIPTION

Figure 1:
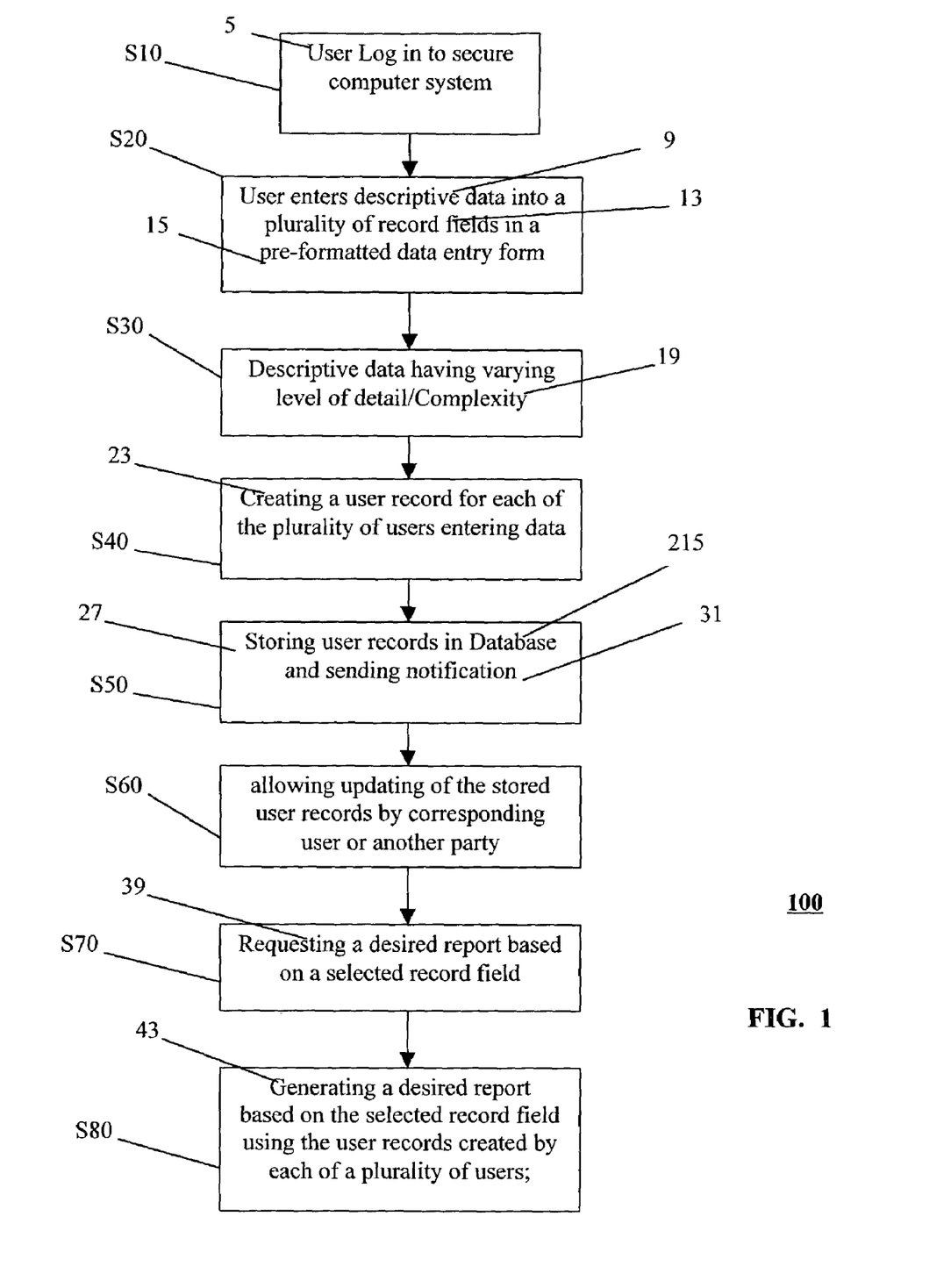
FIG. 1 depicts a flow chart of the steps that can be used in one embodiment of a method for automated generation of a selected report in a computer system.
Figure 2:
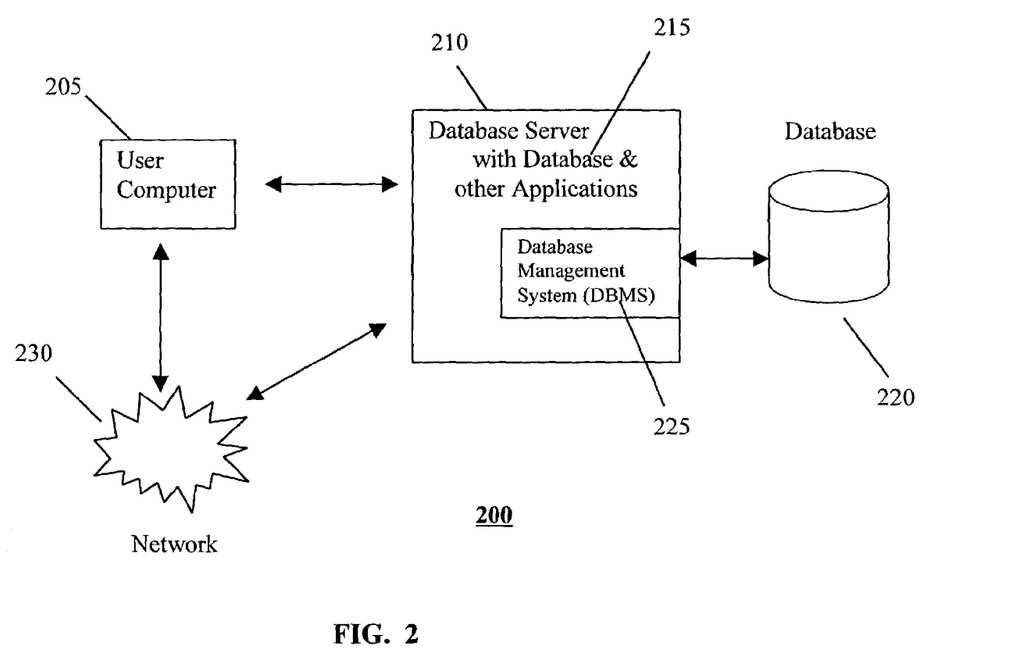
FIG. 2 is a schematic representation of a system where the method for automated generation of a selected report in a computer system of FIG. 1 can implemented.

FIG. 1 is a flow chart with steps for a preferred embodiment of a method 100 for automated generation of a selected report in a computer system according to the present invention. The embodiment shown in FIG. 1 provides an improved method 100 for efficiently generating administrative reports in an automated manner. Further, the method of FIG. 1 enables users contributing to the reports to create and store task, goal, progress and performance related descriptions, of varying complexity and detail, in a central location from which appropriate task, goal and progress descriptions can be selectively retrieved for use in a desired periodic report for use in workload and performance management. Those of skill in the art will readily recognize that this process can be carried out repeatedly as required for the creation of user 5 records and workload and performance management reports in an organization of variable size and organizational levels. FIG. 2 is an illustration of a system 200 where the method 100 for automated generation of a selected report of FIG. 1 can be implemented. Those of skill in the art will readily recognize that the method of FIG. 1 is only a preferred embodiment and that other steps can be used to generate the same or similar reports. Further, FIG. 2 is a simple illustration of a computer system 200 that where the embodiment of FIG. 1 can be implement. Those of skill in the art will recognize that any standalone computer, connected computers or networked computers could also be used to implement the method 100 of FIG. 1.

In Step S10, a user 5 logs in to the system 200 through presentation of valid user identification and password. The login step S10 provides a secure access to a plurality of users 5 to the database system 200 in an organization, though the method would also function without an initial login step albeit in a less secure manner. The user 5 that is logging in could be a lower level user who intends to enter descriptions related to his/her tasks, assignments, goals and performance, as well as progress towards user and organization goals at a single or central location, e.g. a database product 215, 220 and 225 (FIG. 2). Alternatively, the user 5 could be a higher level user who has accessed the system 200 to enter new information or modify existing user 5 descriptions or to request the generation of a certain report. In the latter case, the higher level user 5 desiring the generation of a report would proceed to step S70 and request a certain report.

In step S20, having successfully logged onto the system 200, the user 5 will enter descriptive data or information 9 relating to the user's tasks, goals and progress. The user will preferably enter the various tasks, goals and progress related descriptions into a corresponding plurality of record fields 13 presented to the user 5 on a computer screen 210. The input record fields 13 are preferably part of pre-formatted data entry forms or data entry screens provided by a database application 215 running on a designated database computer or server 210. The user 5 will enter the user information using an associated computer keyboard, a computer mouse and any other user input interface device that allows the user to enter information into the data entry forms.

In step S30, the user 5 will preferably enter a plurality of description relating to tasks, assignments, goals and performance that have varying levels of detail or complexity. In this manner, the entered descriptions can be correlated and coincide with the various reports that may be requested by other users in the future. The data entry forms can have a variable number of data entry fields that will make up user record 23. For example, in one embodiment, the data entry fields include user name, priority, task description, goal description, task priority, goal progress, task progress, weekly report data, bi-weekly report data, monthly report data, quarterly report data, mid-year report data, year-end report data, mid-year review data, and year-end review data. Those of skill in the art will readily recognize more or less data entry fields can be used for creation of a user record 23. Having the various data entry fields with the entered user information and descriptions allows the generation of various desired reports by the database application 215 via appropriate queries or input interaction by a user 5 with the database management system 225.

In Step S40, once the user has entered all his/her information and tasks, assignments, goals and performance description a unique user record 23 is created via the database application 215. The user record 23 created is such that descriptions in each of the data entry fields can be selectively retrieved and included in a desired report. In one embodiment, the user record 23 created will include keys, indications, flags, pointers or other user information that will indicate to the database management system 215 which data entry fields have descriptions therein. In this manner, when a report is to be generated, e.g., a monthly task status report, the database management system 225 will be able to review all created user records 23 and determine whether or not a description was entered in a "monthly task status" field. If a description was entered in that field, the description and user identification for a particular user 23 will be retrieved and included in the monthly task status report to be prepared. If no description was entered in the appropriate field, no description from that particular user 23 will be retrieved for inclusion in the monthly task status report to be prepared.

In step S50, once the user record 23 has been created, the user record is preferably stored in a database 220. The user records 23 and their associated information can then be accessed at a later time for use in the generation of desired report as noted above in the discussion of Step S40. The user record 23 is preferably stored via the database application 215 and associated database management system so that selected descriptions in the stored user records 23 can later be selectively retrieved for inclusion in reports to be generated. The creation and storage of user records 23 will be done for all users 5 that enter descriptions for use in generated reports. Additionally, a communication may be sent to a supervisory user informing the supervisory user that a user record 23 has been created and stored. The communication could be sent by the user 5 or the database application 215 may be configured to automatically send such a communication to the supervisory user. The communication could be any electronic message that delivers the information, for example an e-mail. Once the supervisory user receive the notification, he/she can review the user records 23 or can proceed to request reports.

Those of skill in the art will readily recognize that although a database application 215 is the preferred vehicle for the creation and storage of user records and report generation, other software applications that allow user records to be queried and selected information retrieved for use in the generation of desired reports could be used. For example, in a preferred embodiment, the database application used in this method 100 is Microsoft Access 2000, however other database applications could be used as well, including Corel Paradox, Lotus Approach, IBM or Sybase Database applications, etc.

In Step S60, a user 5 who has previously created and stored a user record 23 may desire to add, edit or delete information contained in the data entry fields 13 of a user record 23. The user 5 may add, edit or delete information in his own user record 23, or may add, edit or delete information from a user record 23 that is not his own. In the latter case, the user must have or be given proper authorization to make such changes to a user record 23 that is not his own. The latter case could be, for example, a case where an upper level user 5, such a manager or supervisor, may desire to modify or make suggestions to an employee's record 23 at a lower level. Once any changes or additions to a user record are made, the revised user record can again be stored in the database 220 in its revised form, ready for possible use in a requested report.

In Step S70, user records 23 have been created and stored in the database 220, a user 5 can requests generation of a report based on certain criteria related to a data entry field or other parameter chosen by the user. The user 5 requesting a certain report will have logged in as noted in Step S110. In this manner, the database computer 210 will know which reports the user 5 is authorize to request and view. The user 5 could be an employee at a first or lowest level with authorization, or more typically, the user 5 will be an individual at a second or higher level such as a manager, supervisor, department head, senior leader, or any other person with appropriate authorization.

The user 5 will preferably interact with the database application 215 running on a server computer 210 to request the generation of one or more reports. The users may directly interact with a server computer or could interact with the server computer 210 via a network connection 230, or any other connection that will allow a user to request generation of a report. The reports generated can be reports such as a biweekly report, monthly report, quarterly report, mid-year report, year end report, progress towards goals report, review and performance reports and status report or any other defined report. Those of skill in the art will readily recognize that additional data entry fields 13 could be included or defined in the user records 23 for the generation of other reports based on the new data entry fields 13. Further, those of skill in the art will also recognize that in addition to other types of reports, other reports relating to a different time period may be defined by a database administrator or a user, e.g., a "10 or 15 day report".

The request for generation of a particular report could be done by submitting a query to a database management system (DBMS) 225 for the desired report. Such as query could be done thought the use of structured query language (SQL) which can be understood and acted upon by the DBMS 225 to generate the appropriate report. Optionally, the database application 215 may allow a user to select a desired report by providing drop down menus which contain a list of all available reports or through a graphics based approach where "buttons" representing defined reports are presented to the user on a computer screen for user selection. In these cases, the user would simply, via his computer mouse, keyboard, or computer interface, select a report form the drop down list or "click" on a "button" labeled with the report the user wishes to request. The user's 5 selections are then interpreted by the DBMS 225 as a request for a defined report, similar to a user query request to the DBMS 225.

In Step S80, after having submitted a request for a desired report, the DBMS 225 will interpret the report request at Step S70 and compile and generate the appropriate periodic report, e.g., a monthly task status report, requested by the user. In one embodiment, the DBMS 225 will scan or review all the created and stored user records 23 residing in the database 220 or any other designated storage location. The DBMS will review each user record 23 that fits the search request criteria to determine whether or not a description was entered in a "monthly task status" field by the user 5. If a description is present in the pertinent search field, the DBMS 225 will retrieve the entered description and pertinent user identification/information for that particular user record 23. The retrieved description and user information or data can then be included in the desired report is being prepared. The DBMS 225 will do this for each of the plurality of user records 23 in the database 220. If no description was entered in the appropriate data entry field, no description or user record 23 information from that particular user record 23 will be retrieve for inclusion in the monthly task status report to be prepared.

Once the desired report is compiled, the report can be generated. The reports could be presented to the user 5 on a computer screen, they could be sent to a printer or to a disk storage location. Additionally, the generated report could be sent to or imported into an electronic document such as a Microsoft Word document on the user's computer 205 for further manipulation or review by the user 5, or any other software application running on the user's computer 205. Those of skill in the art will readily see that this same process may be repeated by a user 5 to generate any desired report that is defined by or can be created by the database application 215 DBMS 225 from the user records 23 stored in the database 220.

In this manner, the method describe meets or accommodates the report requirements of an organization or company at different levels in the organization. With this method 100, desired reports, such as workload and performance reports, can be efficiently generated in an automated manner through retrieval of user records residing in a central location. This method 100 and system frees up valuable resource time of full time employees from the highly administrative work of repeatedly preparing description and information for workload and performance reports and substantially eliminates rework for administrative assistant who often consolidate and compile reports.

FIG. 2 illustrates a schematic representation of a system 200 where the method for an automated generation of a selected workload and performance periodic report of FIG. 1 can implemented. The database system is preferably a database application 215 running on a database server computer 210. By running the database application on a database server, multiple users 5 will have access to the database application 215 at any one time for their report generation needs. In a preferred embodiment, the database application 215 comprises a database management system (DBMS) 225 and a database storage 220. The database application 215 will enable a user, via the DBMS 225, to generate desired reports as well as to manipulate and manage the information entered and stored in the database 220 in database tables. The method 100 illustrated in FIG. 1 preferably uses the Microsoft (MS) Access 2000 database application program. However, other database programs can be used as well, including Corel Paradox, Lotus Approach, IBM or Sybase Database applications, among others FIG. 2 further illustrates that a user or users could communicate and interact with the database server 210 directly or through an interconnected network via a user computer 205. Those of skill in the art will readily recognize that the computer system 200 shown could be a simple or complex network of varying size. This could include local area networks (LAN), wide area networks (WAN), metropolitan area network (MAN) or any other computer system 200 where a user 5 can enter and store data in a database and where the same or different user can access the stored information and create desired reports based on the information entered. Further, a user 5 can enter data and information in any number of ways, including a personal computer, a laptop or portable computer, a Macintosh computer, a work station computer, a mainframe computer or any other computer device that is connected to the network or database server 210 that allows the user to enter data and information for subsequent use in creating the desired reports.

The invention has been described and illustrated with respect to certain preferred embodiments by way of example only. Those skilled in the art will recognize that the preferred embodiments may be altered or amended without departing from the true spirit and scope of the invention. Therefore, the invention is not limited to the specific details, representative devices, and illustrated examples in this description. The present invention is limited only by the following claims and equivalents.

I claim:

1. A computer implemented method for generating a workload report and a performance report comprising the steps of:

prompting a user to enter information comprising task, goal and progress data into a first set of corresponding plurality of data fields indicative of a first level of detail, wherein said first level of detail includes detail level data related to at least one of task description goal description, task priority, goal progress, task progress, weekly report data, bi-weekly report data, monthly report data, quarterly report data, mid-year report data, year-end report data, mid-year review data, and year-end review data;

prompting said user to enter said information into a second set of corresponding plurality of data fields indicative of a second level of detail, wherein said second level of detail includes summary level data relating to at least one of task description, goal description, task priori, goal progress, task progress, weekly report data, bi-weekly report data, monthly report data, quarterly report data, mid-year report data, year-end report data, mid-year review data, and year-end review data;

creating a first unique user record for said user comprising said first set of corresponding plurality of data fields and said second set of corresponding plurality of data fields;

storing said first unique user record in a centralized location, said first unique user record being editable by a selected subset of a plurality of users;

retrieving at least one of said first set of corresponding plurality of data fields and said second set of corresponding plurality of data fields from said first unique user record based on a level of detail indicated by at least one of said user and said plurality of users;

using said at least one of said first set of corresponding plurality of data fields and said second set of corresponding plurality of data fields to automatically generate said workload report and said performance report in response to a request made by said at least one of said user and said plurality of users; and enabling said at least one of said user and said plurality of users to subsequently select said first unique user record to automatically create a second unique user record.

2. The method of claim 1, wherein said workload report includes information relating to the current and projected tasks assigned to a selected one of said plurality of users.

3. The method of claim 1, wherein said performance report includes information relating to the status, priority and progress of tasks assigned to a selected one of said plurality of users.

4. The method of claim 1, wherein said performance report includes information relating to the progress toward predetermined goals for a selected one of said plurality of users.

5. The method of claim 1, wherein said selected subset of said plurality of users includes a plurality of predefined authorized users.

6. A computer readable medium bearing instructions for generating a workload report and a performance report, the instructions, when executed, being arranged to cause at least one processor to perform the steps of:

prompting a user to enter information comprising task, goal and progress data into a first set of corresponding plurality of data fields indicative of a first level of detail, wherein said first level of detail includes detail level data related to at least one of task description goal description, task priority goal progress, task progress, weekly report data, bi-weekly report data monthly report data quarterly report data, mid-year port data, year-end report data mid-year review data, and year-end review data;

prompting said user to enter said information into a second set of corresponding plurality of data fields indicative of a second level of detail, wherein said second level of detail includes summary level data relating to at least one of task description, goal description, task priority, goal progress, task Progress, weekly report data bi-weekly report data, monthly report data, quarterly report data, mid-year report data, year-end report data, mid-year review data, and year-end review data;

creating a first unique user record for said user comprising said first set of corresponding plurality of data fields and said second set of corresponding plurality of data fields; storing said first unique user record in a centralized location, said first unique user record being editable by a selected subset of a plurality of users;

retrieving at least one of said first set of corresponding plurality of data fields and said second set of corresponding plurality of data fields from said first unique user record based on a level of detail indicated by at least one of said user and said plurality of users;

using said at least one of said first set of corresponding plurality of data fields and said second set of corresponding plurality of data fields to automatically generate a said workload report and said performance report in response to a request made by said at least one of said user and said plurality of users; and enabling said at least one of said user and said plurality of users to subsequently select said first unique user record to automatically create a second unique user record.

7. The computer readable medium of claim 6, wherein said workload report includes information relating to the current and projected tasks assigned to a selected one of said plurality of users.

8. The method of claim 1, wherein said performance report includes information relating to the status, priority and progress of tasks assigned to a selected one of said plurality of users.

9. The computer readable medium of claim 6, wherein said performance report includes information relating to the progress toward predetermined goals for a selected one of said plurality of users.

10. The computer readable medium of claim 6, wherein said selected subset of said plurality of users includes a plurality of predefined authorized users.

* * * * *

UNITED STATES PATENT AND TRADEMARK OFFICE
CERTIFICATE OF CORRECTION

| | | |
|---|---|---|
| PATENT NO. | : 7,113,933 B1 | Page 1 of 1 |
| APPLICATION NO. | : 10/289599 | |
| DATED | : September 26, 2006 | |
| INVENTOR(S) | : Laura M. Imholte | |

It is certified that error appears in the above-identified patent and that said Letters Patent is hereby corrected as shown below:

In column 10, line 66, delete "priori" and insert therefor --priority--.

In column 12, line 6, delete "Progress" and insert therefor --progress--.

Signed and Sealed this

Twenty-sixth Day of December, 2006

JON W. DUDAS
*Director of the United States Patent and Trademark Office*

UNITED STATES PATENT AND TRADEMARK OFFICE
CERTIFICATE OF CORRECTION

PATENT NO.         : 7,113,933 B1
APPLICATION NO. : 10/289599
DATED              : September 26, 2006
INVENTOR(S)        : Laura M. Imholte It is certified that error appears in the above-identified patent and that said Letters Patent is hereby corrected as shown below:

In column 2, line 35, delete "received" and insert therfor --receive--.
In column 2, line 48, delete "manage" and insert therfor --manager--.
In column 3, line 10, delete "received" and insert therfor --receive--.
In column 4, line 4, delete "process" and insert therfor --processes--.
In column 4, line 13, delete "assistant" and insert therfor --assistants--.
In column 4, line 14, delete "amounts" and insert therfor --amount--.
In column 4, line 23, delete "stored" and insert therfor --store--.
In column 4, line 23, delete "e.g." and insert therfor --e.g.,--.
In column 4, line 30, delete "since takes" and insert therfor --since it takes--.
In column 5, line 61, delete "allows" and insert therfor --allow--.
In column 5, line 65, delete "allows" and insert therfor --allow--.
In column 6, line 54, delete "implement" and insert therfor --implemented--.
In column 6, line 58, delete "in to" and insert therfor --into--.
In column 6, line 67, delete "e.g." and insert therfor --e.g.,--.
In column 8, line 12, delete "receive" and insert therfor --receives--.
In column 8, line 41, delete "requests" and insert therfor --request--.
In column 8, line 46, delete "authorize" and insert therfor --authorized--.
In column 9, line 5, delete "as" and insert therfor --a--.
In column 9, line 6, delete "thought" and insert therfor --through--.
In column 9, line 15, delete "form" and insert therfor --from--.
In column 9, line 39, delete "retrieve" and inesrt therfor --retrieved--.
In column 10, line 17, delete "others" and insert therfor --others.--.

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

PATENT NO.        : 7,113,933 B1
APPLICATION NO.   : 10/289599
DATED             : September 26, 2006
INVENTOR(S)       : Laura M. Imholte It is certified that error appears in the above-identified patent and that said Letters Patent is hereby corrected as shown below:

In column 2, line 35, delete "received" and insert therefor --receive--.
In column 2, line 48, delete "manage" and insert therefor --manager--.
In column 3, line 10, delete "received" and insert therefor --receive--.
In column 4, line 4, delete "process" and insert therefor --processes--.
In column 4, line 13, delete "assistant" and insert therefor --assistants--.
In column 4, line 14, delete "amounts" and insert therefor --amount--.
In column 4, line 23, delete "stored" and insert therefor --store--.
In column 4, line 23, delete "e.g." and insert therefor --e.g.,--.
In column 4, line 30, delete "since takes" and insert therefor --since it takes--.
In column 5, line 61, delete "allows" and insert therefor --allow--.
In column 5, line 65, delete "allows" and insert therefor --allow--.
In column 6, line 54, delete "implement" and insert therefor --implemented--.
In column 6, line 58, delete "in to" and insert therefor --into--.
In column 6, line 67, delete "e.g." and insert therefor --e.g.,--.
In column 8, line 12, delete "receive" and insert therefor --receives--.
In column 8, line 41, delete "requests" and insert therefor --request--.
In column 8, line 46, delete "authorize" and insert therefor --authorized--.
In column 9, line 5, delete "as" and insert therefor --a--.
In column 9, line 6, delete "thought" and insert therefor --through--.
In column 9, line 15, delete "form" and insert therefor --from--.
In column 9, line 39, delete "retrieve" and insert therefor --retrieved--.
In column 10, line 17, delete "others" and insert therefor --others.--.

Signed and Sealed this

Second Day of October, 2007

JON W. DUDAS
*Director of the United States Patent and Trademark Office*